United States Patent
Kazinnik et al.

(10) Patent No.: US 10,338,242 B2
(45) Date of Patent: Jul. 2, 2019

(54) SURFACE WAVE TOMOGRAPHY USING SPARSE DATA ACQUISITION

(71) Applicant: CONOCOPHILLIPS COMPANY, Houston, TX (US)

(72) Inventors: Roman Kazinnik, Houston, TX (US); Michael Davidson, Houston, TX (US); Ali Tura, Houston, TX (US); Aaron L. Janssen, Houston, TX (US); Charles C. Mosher, Houston, TX (US); Ronnie B. Darnell, Anchorage, AK (US)

(73) Assignee: ConocoPhillips Company, Houston, TX (US)

( * ) Notice: Subject to any disclaimer, the term of this patent is extended or adjusted under 35 U.S.C. 154(b) by 82 days.

(21) Appl. No.: 15/157,567

(22) Filed: May 18, 2016

(65) Prior Publication Data

US 2016/0341839 A1 Nov. 24, 2016

Related U.S. Application Data

(60) Provisional application No. 62/164,259, filed on May 20, 2015.

(51) Int. Cl.
*G01V 1/28* (2006.01)
*G01V 1/30* (2006.01)

(52) U.S. Cl.
CPC .......... *G01V 1/28* (2013.01); *G01V 1/303* (2013.01); *G01V 1/282* (2013.01); *G01V 1/305* (2013.01); *G01V 2210/121* (2013.01); *G01V 2210/1295* (2013.01); *G01V 2210/1425* (2013.01); *G01V 2210/169* (2013.01); *G01V 2210/21* (2013.01); *G01V 2210/614* (2013.01); *G01V 2210/6122* (2013.01); *G01V 2210/6222* (2013.01)

(58) Field of Classification Search
CPC ..................... G01V 1/28; G01V 2210/6122
USPC ...................................... 367/38, 54
See application file for complete search history.

(56) References Cited

U.S. PATENT DOCUMENTS

| | | | |
|---|---|---|---|
| 7,330,799 B2 | 2/2008 | Lefebvre et al. | |
| 8,892,410 B2 | 11/2014 | Krohn | |
| 2006/0203613 A1 | 9/2006 | Thomsen et al. | |
| 2008/0294393 A1 | 11/2008 | Laake et al. | |
| 2011/0134722 A1* | 6/2011 | Virgilio | G01V 1/30 367/75 |
| 2011/0166843 A1* | 7/2011 | Hsu | G01V 11/00 703/10 |
| 2011/0255371 A1 | 10/2011 | Jing et al. | |
| 2012/0043091 A1 | 2/2012 | Leahy et al. | |

FOREIGN PATENT DOCUMENTS

GB 2467326 A * 8/2010 ............... G01V 1/30

OTHER PUBLICATIONS

Fan-Chi Lin et al, "Surface wave tomography of the western United States from ambient seismic noise: Rayleigh and Love wave phase velocity maps", Geophysical Journal International, vol. 173, Issue 1, pp. 281-298, (Year: 2008).*

(Continued)

*Primary Examiner* — Ian J Lobo

(57) ABSTRACT

Method and system for ongoing monitoring for underground structure at or near a production wellpad is provided. The system includes a sparse acquisition grid and utilizes information obtained from Rayleigh waves to monitor subsurface structures.

20 Claims, 3 Drawing Sheets

(56) References Cited

OTHER PUBLICATIONS

Gouédard, Pierre, et al. "Surface-wave eikonal tomography for dense geophysical arrays", Massachusetts Institute of Technology. Earth Resources Laboratory (Year: 2012).*

Kneisel et al., "Advances in Geophysical methods for permafrost investigations", Permafrost and Perglacial Processes, vol. 19, Iss 2 (Apr. 2008), pp. 157-178.*

Haney M, et al., Imaging lateral heterogeneity at Coronation Field with surface waves, SEG Annual Meeting, Denver 2010.

Haney,M., et al., Rayleigh-wave Tomography at Coronation Field, Canada: The topography effect; The Leading Edge, p. 54-61, Jan. 2012.

McMechan, G. et al., Analysis of dispersive waves by wave-field transformation: Geophysics, v. 46, p. 869-874 (1981).

Park, Choon Byong, et al., Imaging dispersion curves of surface waves on multichannel record: 68th Annual International Meeting, Society of Exploration Geophysics, Expanded Abstracts, p. 1377-1380 (1998).

Lin, F.C. et al., Eikonal tomography: surface wave tomography by phase front tracking across a regional broad-band seismic array, Geophys. J. Int. 177, 1091-1110 (2009).

International Search Report for related case, App. No. PCT/US2016/032983, dated Aug. 26, 2016.

* cited by examiner

SURFACE WAVE TOMOGRAPHY USING SPARSE DATA ACQUISITION

PRIORITY CLAIM

This application is a non-provisional application which claims benefit under 35 USC § 119(e) to U.S. Provisional Application Ser. No. 62/164,259 filed May 20, 2015, entitled "NEAR SURFACE ANALYSIS OF PRODUCTION ANOMALIES USING RAYLEIGH WAVES," which is incorporated herein in its entirety.

FIELD OF THE DISCLOSURE

The present invention generally relates to a system and method for monitoring subterranean formation, and more particularly to a system and method for monitoring near-surface structures using Rayleigh waves.

BACKGROUND OF THE DISCLOSURE

Rayleigh waves are surface waves that can travel as ripples along or near the surface of the earth. During a seismic survey, seismic sources generate Rayleigh waves along with other types of waves. Classic reflection seismology typically ignores Rayleigh waves because these waves propagate horizontally, have limited depth sensitivity, and exhibit velocity dispersion. For onshore seismic exploration, much effort is concentrated on designing and deploying receiver arrays that can attenuate horizontally traveling surface waves. Moreover, classic seismic approaches for monitoring near surface regions typically require expensive data acquisition using a dense grid of seismic sources and receivers over a period of weeks to month(s). Due to the high cost of data acquisition, continuous or persistent monitoring of the subsurface over a longer period of time is considered unpractical.

SUMMARY OF THE DISCLOSURE

One example of a method for monitoring subsurface structure includes: a) obtaining seismic data; b) estimating travel time or phase delay or both of Rayleigh waves in the seismic data at a central frequency; c) performing tomography to the travel time or phase delay or both of the horizontal slice at the central frequency to obtain a slice of seismic velocity at the central frequency; d) repeating steps b) to c) for a range of central frequencies; and e) performing a dispersion inversion on slices of seismic velocity for the range of central frequency to obtain 3-D velocity cube in depth.

Another example of a method for monitoring subsurface structure includes: a) obtaining seismic data using a sparse acquisition grid; b) estimating travel time or phase delay or both of Rayleigh waves in the seismic data at a central frequency; c) performing tomography to the travel time or phase delay extracted the central frequency to obtain a slice of seismic velocity at the central frequency; d) repeating steps b) to c) for a range of central frequencies; and e) performing a dispersion inversion on slices of seismic velocity for the range of central frequency to obtain 3-D velocity cube in depth.

DETAILED DESCRIPTION

Figure 1A:
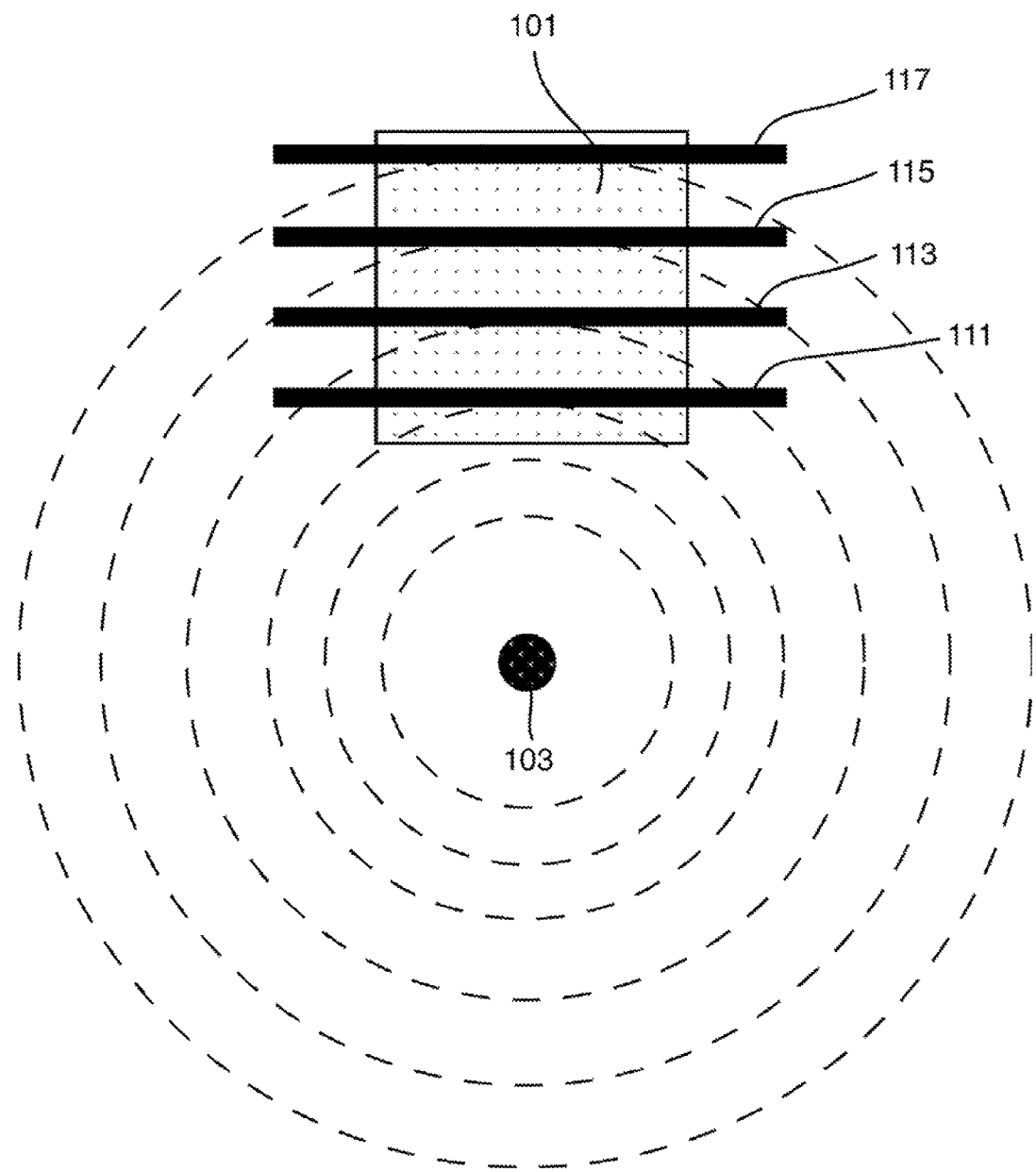
FIG. 1A-B shows embodiments of this disclosure. (A) a seismic source and four lines of receivers are shown; (B) a seismic source and a receiver grid are shown.

The present invention provides method and system for monitoring subsurface structure using seismic information from Rayleigh waves. This invention is particularly useful for monitoring near-surface regions to check for containment, near-surface expulsions, leaks, preservation of well integrity, avoidance of well loss or shearing, production anomalies (abrupt changes or discontinuities in recorded seismic data), and the like. The region may be, for example, localized just below the surface but above a hydrocarbon reservoir.

One of the advantages of the present invention is that useful seismic information can be obtained using a sparse acquisition grid. As used herein, the term "sparse acquisition" refers to the total number and/or density of seismic sources and/or receivers used to acquire seismic data. A sparse acquisition grid will generally have far fewer number of sources and/or receivers compared to conventional seismic acquisition grid configurations. The exact number of sources and/or receivers will be application dependent. In some cases, even a single seismic source may be sufficient to generate useful seismic data. The upper limit on the number of seismic sources can be determined empirically. At some point, adding an additional seismic source may not noticeably increase quality of the seismic data. Even at this point, the total number of seismic sources needed should be much fewer compared to conventional techniques.

Currently, seismic sources are relatively expensive while receivers are very inexpensive. In practical terms, the receiver configuration may depend largely on targeted resolution. In general, denser configurations will result in better resolution and accuracy, whereas sparser configurations will be limited to larger structures. Greatly reducing the number of sources can also significantly lower cost because it will reduce the time needed to acquire meaningful seismic data. Because of these cost-efficient benefits, the present invention can provide continuous or frequent monitoring of the subsurface over much longer periods as compared to conventional methods. Other advantages will be apparent from the disclosure herein.

Since the present method does not exclusively rely on Fourier transform techniques to migrate or obtain images, the receiver grid does not have to be uniformly distributed on the field. Moreover, the receivers need not locate at or near, for example, the production anomaly of interest, as long as the anomaly is located between the source and at least one of the receivers. In one embodiment, the receivers are configured around a wellpad. For monitoring purpose, the receivers can be set as mobile unit, or permanently placed in the field for long term monitoring.

The type of seismic source is not limited, as long as the fidelity of signal can be maintained. The source may be any mechanical source of high- or low frequency energy; moving bulldozers, air gun, dirt whackers, hammer blows, and vibrators have been used. Some discretion is advised as the source must operate for long periods of time, and the physics of what is happening are important. Rayleigh waves have predominantly vertical motion; thus, a source whose impedance is matched to the soil and whose energy is concentrated in the direction and frequency band of interest will be more successful.

The type of receivers is not limited, as long as they can accurately detect and record the seismic waves with low cost. Non-limiting examples of the receivers include geophones, accelerometers, and hydrophones. The propagating seismic energy is recorded as a continuous signal representing displacement, velocity, acceleration, or other recorded variation as a function of time and/or frequency. Multiple combinations of energy source and sensor can be subsequently combined to create a near continuous image of the subsurface that lies beneath the survey area. One or more sets of seismic signals may be assembled in the final seismic survey.

Without being limited by theory, depth sensitivity of the present invention can be governed according to a formula. Assuming seismic shear velocity is approximately 5000 ft/s, depth sensitivity can be calculated as $$\left(\frac{5000\frac{\text{ft}}{\text{s}}}{\text{frequency}}\right)/2,$$

where frequency is central frequency of the Rayleigh wave frequency. The central frequency should generally be selected to be approximately twice the depth of interest. For example, if the Rayleigh wave frequency is 5 Hz, depth sensitivity is approximately 500 feet below the surface. Thus, advancement of seismic source technologies, particularly, low frequency sources, can significantly increase effectiveness of the method. High fidelity, low frequency seismic vibrators, capable of 0.1 Hz, may be on the horizon (capable of 25,000 feet depth sensitivity).

Once seismic data has been acquired, it can be analyzed to estimate or determine either travel time (i.e., absolute time from t=0) or phase delay (i.e., differential time) of a propagating Rayleigh wave. Rayleigh waves at different frequencies should have different travel times and phase delays because the velocity of Rayleigh wave is dependent on its wavelength (and therefore frequency). This characteristic of Rayleigh waves leads to dispersion when propagating through a non-homogeneous medium. In other words, dispersion refers to the phenomena of waves of different wavelengths spreading out over time. A dispersion curve will be a plot showing the relationship of speed versus frequency.

According to one embodiment, travel time and/or differential time is estimated or determined at a central frequency of generated Rayleigh waves. This can be repeated for a range of central frequencies. For example, the central frequencies can range from about 0.1 Hz to about 50 Hz. The lower frequency range is mainly determined by available seismic source technology. Calculation time(s) can be made at various frequency increments such as, but not limited to, 0.1 Hz, 0.5 Hz, 1 Hz, 2 Hz, 5 Hz, and the like. At each central frequency, a horizontal slice of travel times can be obtained. Next, seismic velocity can be solved by applying tomography to the slice of travel times for each central frequency slice. The result is slice of seismic velocities for each central frequency slice. Finally, each slice of seismic velocities is inverted to a slice at a depth. This can be repeated to generate multiple slices at different depths which can be used to construct a 3D model.

The method of the present invention may be carried out continuously or persistently over a longer period of time (e.g., months to years) as compared to some conventional seismic techniques. For example, the method can be carried out, in which seismic data is acquired every day, every few days, weekly, bi-weekly, for months or even years. The use of sparse acquisition grid enables continuous or persistent monitoring to be economically feasible.

Two common methods of data gathering include, but are not limited to, spectral analysis of surface waves (SASW) and multi-channel analysis of surface waves (MASW). These methods can use active or passive seismic sources. Passive sources utilize ambient noise, while active sources include traditional seismic sources that generate sound. Overall, passive energy sources usually require more time when data gathering than active energy. The spectral analysis surface wave (SASW) technique typically requires the use of a spectral analyzer. The spectral analyzer is used to study the frequency and phase of signals being recorded. An expanding spread array is useful in minimizing the near field effects of surface waves. An increase in offset distance will result in more time for the waves to reach each geophone, giving the longer wavelengths more time to disperse. The shot gather is modified to minimize the influence of body waves. As the data is gathered, the spectral analyzer is able to generate the dispersion curves for the survey area in real time. The multi-channel analysis of surface waves (MASW) technique can be performed similar to a traditional seismic acquisition whereby there is a geophone spread that is acquiring seismic data. The resulting data is processed by picking out the surface wave arrivals from the acquired distance vs. time plot. Based on the distance vs. time plot, the dispersion curve is created.

In some embodiments, shear velocity can also be obtained and used to build elastic near surface models. For example, log P velocity and density can be used to convert the shear velocity to Poisson Ratio and Young's Modulus. Characterization (e.g., change in shear velocity, P velocity, stress, pressure, of certain common constituents of the earth) of rock samples can be used to link shear velocity changes to elastic property changes, such as stress changes.

Example 1

Figure 1B:
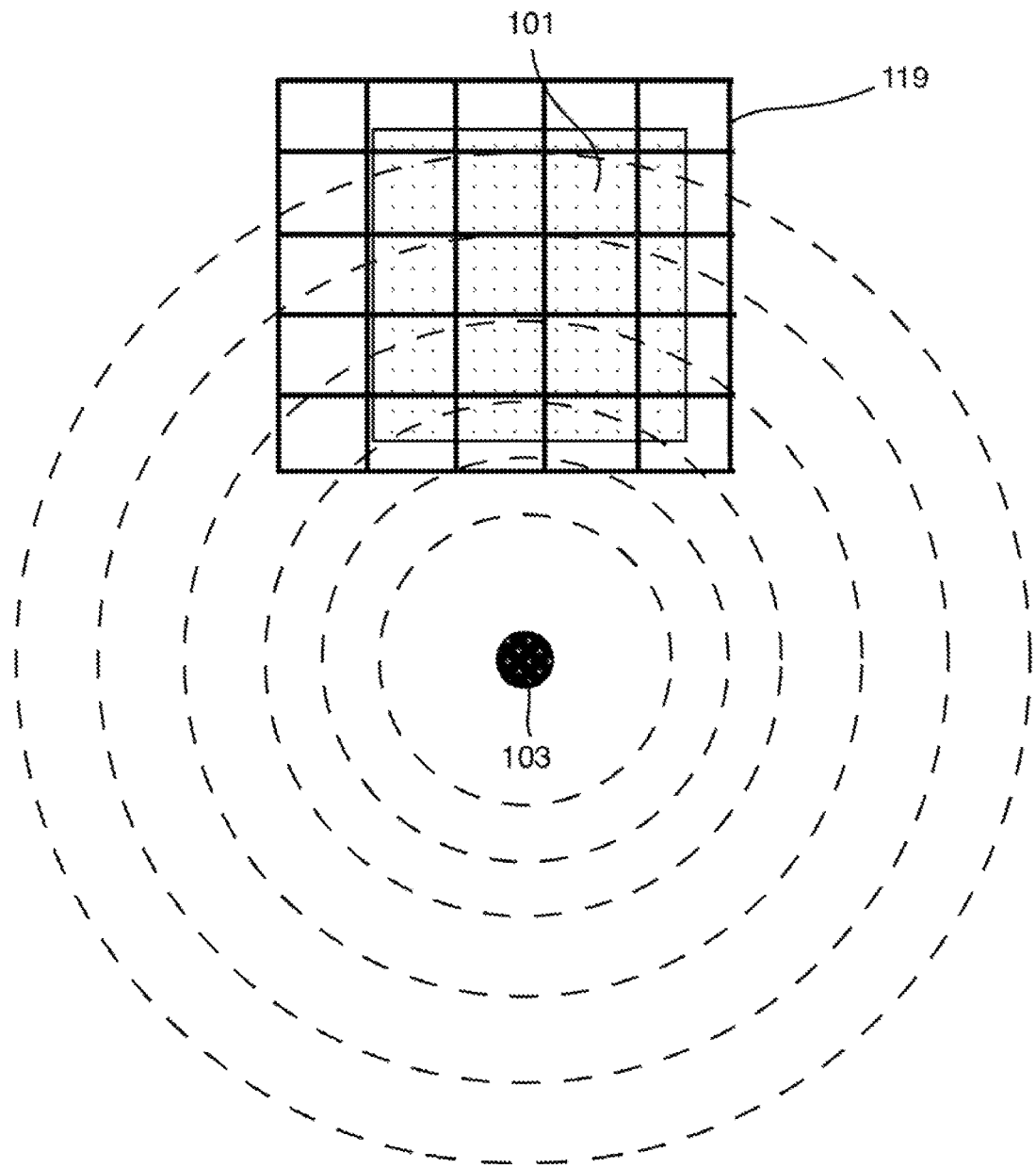

FIG. 1A illustrates an embodiment of the present invention. As shown, production wellpad 101 is under production. Typically, there will be about a dozen injection and production wells on a given wellpad. Seismic source 103 is placed away from the wellpad, whereas first, second, third and fourth lines of receivers 111, 113, 115 and 117, respectively, are placed in parallel directly over the wellpad. The first line of receiver 111 is closest to the seismic source 103, the second line 113 is second closest to the seismic source 103, and so on. An alternative embodiment is illustrated in FIG. 1B, where receiver grid 119 serves a similar function as the lines of receivers 111, 113, 115, 117 in FIG. 1A. The receiver grid 119 covers the entire wellpad. As depicted as dashed circles in FIGS. 1A-1B, the Rayleigh waves are surface waves that propagate like ripples. The seismic source 103 can create shots for a given central frequency. Once generated, seismic waves will propagate until they eventually reach each line of receivers. The receivers can record amplitude and travel time of the seismic waves. While this Example shows a specific number of receiver lines, this is not intended to be limiting. The goal is to obtain sufficient coverage at reasonable cost.

Using the design shown in FIG. 1A, seismic data acquisition was carried out in an area plagued with thawing-induced compaction and deformation that caused significant cost in maintenance and/or drilling new wells to replace the damaged wells. The thawing was more prevalent when steam-assisted production was employed, in which the increased temperature downhole causes the frozen geological structure to thaw. In one real world scenario, the recording from the first line of receivers (L1) did not have any disruption in the recorded seismic data, suggesting that the Rayleigh wave velocity is constant throughout the length between the seismic source and the first receiver line and thus no discernable geological anomalies are present. The recording from the second line (L2) showed a little disruption toward the right side. The disruption was more prominent in the recordings from the third line (L3) and the fourth line (L4). This disruption is an indication that certain geological structure underneath L2-L4 is different from the rest, i.e. has an anomaly, and causing the difference in shear velocities.

The shot records can be inverted to map the actual anomalies in terms of changes in velocity. A velocity slice can be obtained by tomography at a particular central frequency. For example, tomography from shot records of 15 Hz and 5 Hz at approximately 200 feet and 600 feet (the sensitive depths at corresponding frequencies) can give an indication of thawing. A typical output is a color-coded velocity profile of the underground structure (at about 200 feet and 600 feet, respectively in this case). A slower velocity area, as compared to surrounding structure, would indicate phase change in the area. A 2D tomographic slice can show that geological structure around injectors and producers is different from the rest of the formation due to the hydrocarbon mobilized by the injected steam.

Figure 2:
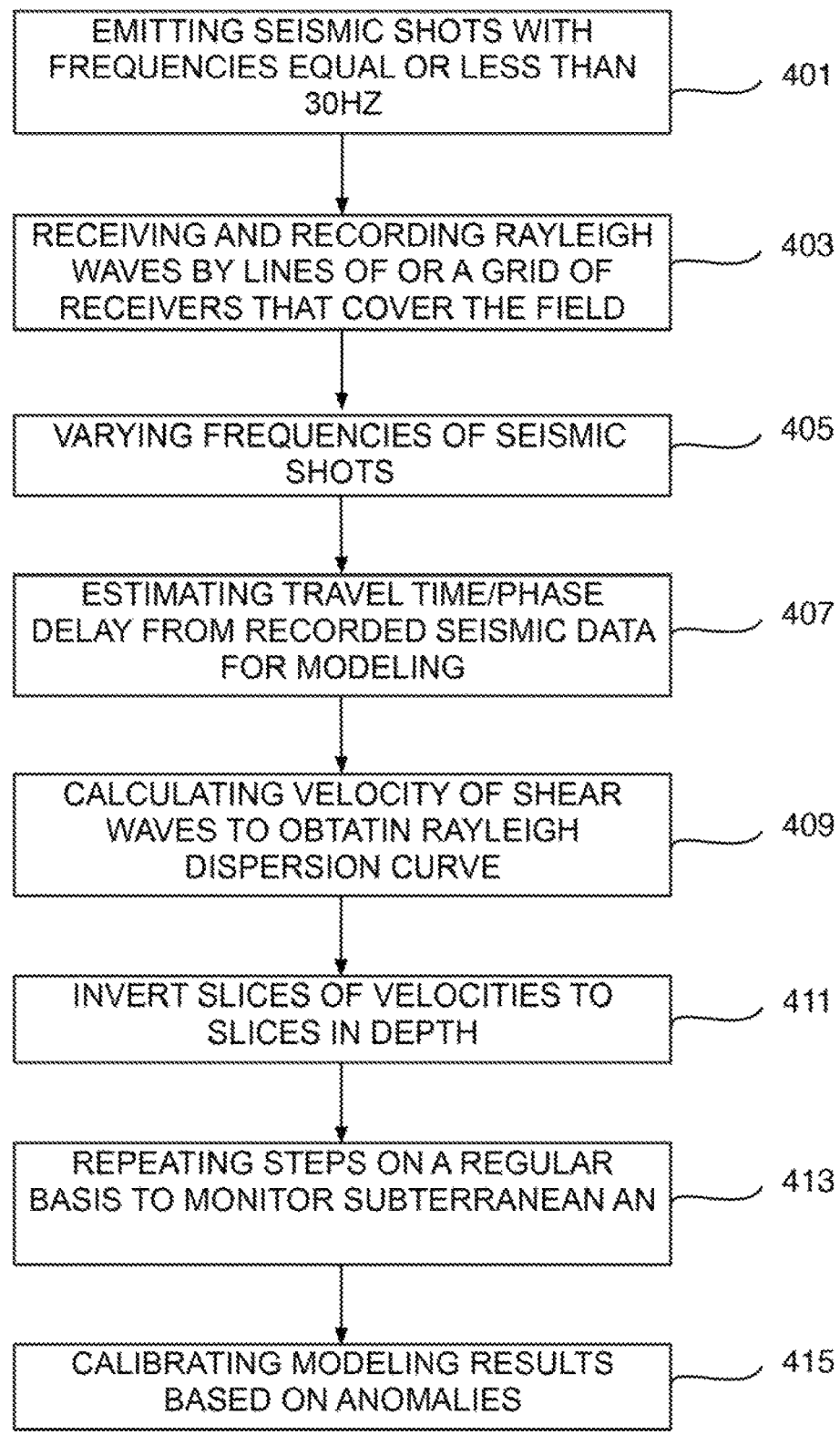
FIG. 2 is a flow diagram of the method of this disclosure.

FIG. 2 illustrates the flow diagram of the disclosed method. The method is based on the configuration in FIG. 1. In step 401, seismic shots are emitted from the seismic source. Considering sensitive depth, the frequencies below 30 Hz are typically chosen.

The source may be a regular seismic vibrator mounted on a truck, an air gun, or even a heavy truck that passes by and creates some vibration. As long as the distance and travel time between the source and the receivers can be determined to measure the velocity.

In step 403, the Rayleigh waves are received and recorded by receivers. In the illustrated embodiment shown in FIG. 1, the receivers are geophones, and each line has 144 geophones spaced by 10 feet apart. Each line is 100 feet away from the next line of receivers, and the first line is 200 feet away from the seismic source. Of course, these numbers are exemplary only, and other distances could be used based on the reservoir characteristics and available resources. In another embodiment as shown in FIG. 1B, a grid of receivers is configured, and the receivers can be configured non-uniformly because the use of Rayleigh wave for anomaly detection is not dependent on Fourier Transform to migrate or to obtain image for modeling. As long as the receivers are configured to adequately cover the field, the rest can be calculated readily.

In step 405, the frequency of the energy source is varied so as to generate waves of different wavelengths. The frequency can be changed in 1 Hz increments until the maximum frequency is reached. In one embodiment, the maximum frequency is 20 Hz, and therefore shot records of 20 different frequencies can be obtained. In one embodiment, the frequency can vary in 2 Hz, 3 Hz, 5 Hz or 10 Hz increments. However, skilled artisan can understand that even 1 single shot at a fixed frequency may be sufficient to obtain velocity modeling of the underground structure.

In step 407, estimate either the travel time (absolute time from emitting the shot to receiving signal at receivers) or phase delay (which is differential times) from the acquired seismic data. For each different frequency there will be a different phase delay. Also, by incremental change to the frequency, horizontal slice of travel times unique to each frequency can be obtained. In other words, for each frequency used, a frequency-specific phase delay and/or horizontal slice will be available for tomography.

In step 409, seismic velocity of shear waves for each slice is determined by tomography. The results are slices of velocities for each frequency. The dispersion curve as shown in FIG. 2 is therefore obtained.

In step 411, the slices of velocities are inverted to slices of depth for each frequency by dispersion inversion. The method of inversion is not limited, and can be any inversion method that is used by a skilled person in the art. Non-limiting methods of inversion include phase delay or Frequency-Time Analysis (FTAN) method. Alternatively, inversion of velocity, horizontal tomography can also be obtained depending on the actual need.

In step 413, the whole process is repeated again after a period of time for long-term monitoring purpose. In one embodiment, the whole process is performed once a week. By comparing the slices of depth for each frequency over a long period of time, one can easily determine whether there is an anomaly, the location of it, and the progression thereof. If necessary, the location of seismic source and the lines of receivers can be changed so as to more accurately pinpoint the location of anomaly. For example, instead of one single seismic source, one can set up two seismic sources at opposite ends of the lines of receivers. Or alternatively, the entire setting can be rotated 90° to conduct the survey from a different angle to narrow down the actual location of the anomalies.

In one example of determining velocity of traveltimes, to implement group velocity tomography, we use the PRONTO tomography code described by Aldridge and Oldenburg (1993). The algorithm is based on a finite-difference solution of the Eikonal equation and solves the inverse problem using a weighted-damped least-squares scheme. Originally designed for crosswell tomography, the 2D code is easily adapted to build Rayleigh wave group velocity maps.

Finally, in step 415 the shot records and modeling results are compared and calibrated.

By setting up the seismic survey system as disclosed herein, inventors were able to continue monitoring the underground structure with as few as one shot per week, as opposed to thousands of shots with conventional reflective seismic survey. The sparse shot and the significant saving on operation cost is the benefit of using Rayleigh wave as the long-term monitoring of subterranean anomalies.

Although in this example the disclosed system and method is used to detect thawing-related problems, the same methodology can be applied to other underground structures or anomalies. For example, if the monitoring shows that an underground water reservoir is depleting at a fast pace without sufficient supply, this could be an early sign of deformation or compaction.

With the disclosed method and system, long term monitoring of underground structure is economically appealing as opposed to the reflective seismic survey where thousands of shots are required for accurate modeling and imaging.

As used herein, "FTAN (Frequency Time Analysis) method" refers to the method based on the study of surface wave (both Rayleigh and Love) group velocities and is successfully used in seismology. This method employs a system of narrow-band Gaussian filters, with varying central frequency, that do not introduce phase distortion and give a good resolution in the time-frequency domain. For each filter band the square amplitude of the inverse FFT of the filtered signal is the energy carried by the central frequency component of the original signal. Because the arrival time is inversely proportional to group velocity, the energy can be obtained as a function of group velocity at a specific frequency for known distance. After repeating the process in different frequencies, a FTAN map can be obtained. A FTAN map is the image of a matrix, in which the columns represent the energy values at a certain period and the rows represent the energy values at constant group velocity. A sequence of frequency filters and time window is applied to the dispersion curve for an easy extraction of the fundamental mode. The floating filtering technique, combined to a phase equalization, permits to isolate the fundamental mode from the higher modes. FTAN is useful in defining VS profiles of shallow geological structures.

As used herein, a "disruption" or "anomaly" refers to an abrupt change or discontinuity in recorded seismic data or a processed form thereof. Example of a disruption is seen in FIG. 2, which shows recorded raw seismic data (arrows indicating disruption).

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| Hz | Hertz |
| FTAN | Frequency time analysis |
| AVO | Amplitude variation with offset - a general term for referring to the dependency of the seismic attribute, amplitude, with the distance between the source and receiver (the offset) |
| NMO | Normal move out - describes the effect that the distance between a seismic source and a receiver (the offset) has on the arrival time of a reflection in the form of an increase of time with offset |
| FWI | full-waveform inversion |

REFERENCES

The following references are incorporated by reference in their entirety:
1) Haney M. M., & Douma, H., IMAGING LATERAL HETEROGENEITY AT CORONATION FIELD WITH SURFACE WAVES, available at www.cwp.mines.edu/~huub/pubs/mhaney_SEG_2010.pdf.
2) Haney M. M. & Douma, H., RAYLEIGH WAVE TOMOGRAPHY AT CORONATION FIELD, CANADA: THE TOPOGRAPHY EFFECT
3) McMechan, G. A., and Yedlin, M. J., Analysis of dispersive waves by wave-field transformation: Geophysics, v. 46, p. 869-874 (1981).
4) Park, et al., Imaging dispersion curves of surface waves on multichannel record: 68th Annual International Meeting, Society of Exploration Geophysics, Expanded Abstracts, p. 1377-1380 (1998).
5) Lin F. C. et al., Eikonal tomography: surface wave tomography by phase front tracking across a regional broad-band seismic array, Geophys. J. Int. 177, 1091-1110 (2009).
6) U.S. Pat. No. 8,892,410
7) US20080294393
8) U.S. Pat. No. 7,330,799

The invention claimed is:

1. A method for monitoring a frozen subsurface structure to detect thawing-related problems, the method comprising:
obtaining seismic data;
estimating travel time or phase delay or both of Rayleigh waves in the seismic data at a central frequency;
performing tomography to the travel time or the phase delay estimated at the central frequency to obtain a slice of seismic velocity at the central frequency;
repeating the estimating of the travel time or phase delay or both and the performing of the tomography to the travel time or the phase delay for a range of central frequencies;
performing a dispersion inversion on slices of seismic velocity for the range of central frequencies to obtain a 3-D velocity cube in depth, the 3-D velocity cube in depth providing an indication of thawing of the frozen subsurface structure; and
monitoring the thawing of the frozen subsurface structure via repeating at least the obtaining of the seismic data every day, every few days, or bi-weekly to determine a progression of the thawing.

2. The method of claim 1, wherein the subsurface structure includes a near surface layer over a hydrocarbon production reservoir.

3. The method of claim 1, wherein the seismic data is obtained using a sparse acquisition grid that includes between about 1 to about 25 seismic sources.

4. The method of claim 1, wherein the seismic data is obtained using a non-uniform grid of seismic sources.

5. The method of claim 1, wherein the seismic data is obtained using a non-uniform grid of seismic receivers.

6. The method of claim 1, wherein the range of central frequencies is between about 0.1 Hz or about 50 Hz.

7. The method of claim 1, wherein the monitoring is continuous for at least about one month.

8. The method of claim 1, wherein the monitoring is continuous for at least about a year.

9. The method of claim 1, wherein the monitoring monitors production anomalies.

10. A method for monitoring a frozen subsurface structure to detect thawing-related problems, the method comprising:
obtaining seismic data using a sparse acquisition grid;
estimating travel time or phase delay or both of Rayleigh waves in the seismic data at a central frequency;
performing tomography to the travel time or the phase delay estimated at the central frequency to obtain a slice of seismic velocity at the central frequency;
repeating the estimating of the travel time or phase delay or both and the performing of the tomography to the travel time or the phase delay for a range of central frequencies;

performing a dispersion inversion on slices of seismic velocity for the range of central frequencies to obtain a 3-D velocity cube in depth, the 3-D velocity cube in depth providing an indication of thawing of the frozen subsurface structure; and f) monitoring the thawing of the frozen subsurface structure via repeating at least the obtaining of the seismic data every day, every few days, or bi-weekly to determine a progression of the thawing.

11. The method of claim 10, wherein the sparse acquisition grid includes less than about 25 seismic sources.

12. The method of claim 10, wherein the sparse acquisition grid includes less than about 10 seismic sources.

13. The method of claim 10, wherein the sparse acquisition grid includes 1 seismic source.

14. The method of claim 10, wherein the subsurface structure includes a near surface layer over a hydrocarbon production reservoir.

15. The method of claim 10, wherein the range of central frequencies is between about 0.1 Hz or about 50 Hz.

16. The method of claim 10, wherein the monitoring is continuous for at least about one month.

17. The method of claim 10, wherein the monitoring is continuous for at least about one year.

18. The method of claim 1, wherein the thawing-related problems include deformation or compaction of the frozen subsurface structure.

19. The method of claim 1, wherein the thawing is caused by steam-assisted production.

20. The method of claim 1, wherein the seismic data is obtained via emitting a shot from at least one seismic source.

* * * * *